United States Patent
Phillips et al.

(12)

(10) Patent No.: US 7,133,601 B2
(45) Date of Patent: Nov. 7, 2006

(54) AMPERAGE CONTROL FOR PROTECTION OF BATTERY OVER CURRENT IN POWER TOOLS

(75) Inventors: Alan Phillips, Jackson, TN (US); Julie L. Jones, Jackson, TN (US)

(73) Assignee: Black & Decker Inc., Newark, DE (US)

( * ) Notice: Subject to any disclaimer, the term of this patent is extended or adjusted under 35 U.S.C. 154(b) by 286 days.

(21) Appl. No.: 10/782,400

(22) Filed: Feb. 18, 2004

(65) Prior Publication Data

US 2004/0179829 A1 Sep. 16, 2004

Related U.S. Application Data

(60) Provisional application No. 60/448,267, filed on Feb. 18, 2003.

(51) Int. Cl.
*H02P 7/06* (2006.01)

(52) U.S. Cl. ............ 388/804; 388/800; 388/811; 388/815; 388/907.5; 388/937; 318/599; 318/811

(58) Field of Classification Search ......... 388/937, 388/800, 804, 806, 811, 815, 907.5; 318/599, 318/811, 432
See application file for complete search history.

(56) References Cited

U.S. PATENT DOCUMENTS

| | | | | |
|---|---|---|---|---|
| 4,737,702 | A | | 4/1988 | Koenck ................ 320/40 |
| 5,014,793 | A | * | 5/1991 | Germanton et al. ....... 173/181 |
| 5,154,242 | A | * | 10/1992 | Soshin et al. .......... 173/178 |
| 5,204,608 | A | | 4/1993 | Koenck ................ 320/2 |
| 5,373,205 | A | | 12/1994 | Busick et al. ........... 327/378 |
| 5,675,232 | A | | 10/1997 | Koenck ................ 320/2 |
| 5,731,673 | A | * | 3/1998 | Gilmore .............. 318/432 |
| 5,818,199 | A | | 10/1998 | Beard ................ 320/116 |
| 6,353,705 | B1 | * | 3/2002 | Capps et al. ............ 388/830 |
| 6,680,595 | B1 | * | 1/2004 | Ito .................. 318/434 |
| 6,750,622 | B1 | * | 6/2004 | Simizu et al. .......... 318/139 |

FOREIGN PATENT DOCUMENTS

EP 1398119 A1 9/2003

* cited by examiner

*Primary Examiner*—Rina Duda
(74) *Attorney, Agent, or Firm*—Harness, Dickey & Pierce, P.L.C.

(57) ABSTRACT

Amperage control of a power tool motor is provided by pulse width modulation of current from a power supply. The pulse width modulation may be varied according to the determined motor current and measured power supply voltage. The power supply preferably includes a battery, such a lithium ion or nickel cadmium.

17 Claims, 9 Drawing Sheets

AMPERAGE CONTROL FOR PROTECTION OF BATTERY OVER CURRENT IN POWER TOOLS

CROSS REFERENCE TO RELATED APPLICATIONS

The present application claims priority under 35 U.S.C. § 119 of U.S. Provisional Application No. 60/448,267 filed Feb. 18, 2003. Said U.S. Provisional Application No. 60/448,267 is incorporated by reference.

FIELD OF THE INVENTION

The present invention generally relates to the field of power supply management for power tools, and particularly to a method and apparatus for extending battery life in a power tool.

BACKGROUND OF THE INVENTION

It is a concern in the power tool industry to maximize battery life and to prevent battery damage. Further, it is desirable to maximize motor life and prevent motor damage. Typical cordless power tools use nickel cadmium (NiCd), nickel metal hydride (NiMH) or lithium ion batteries and draw 30 to 35 or more amps while under heavy load. Serious degradation of NiCd battery life occurs at or above 50 amps of current. While under heavy loads, near stall or when a battery is nearly depleted, the power tool may draw in excess of 50 amps. Other battery types have different tolerances for high current. For example, above 15 amps, damage associated with temperature may occur to state of the art lithium ion batteries.

Thus, it would be desirable to provide a circuit to limit current from a battery to a motor in a power tool.

SUMMARY OF THE INVENTION

Accordingly, the present invention is directed to a method and circuit for limiting current to a motor in a power tool.

In a first aspect of the present invention, a method for extending the life of a battery is presented that supplies power to a motor, such as a permanent magnet direct current motor in a power tool. The method for extending battery life may utilize a pulse width modulation controller to supply voltage pulses of an initial width to the permanent magnet direct current motor. The width of the pulse may be altered from an initial width to an alternative width if the current changes beyond a threshold.

In a second aspect of the present invention, the power tool of the present invention may include a power supply, a motor for providing torque to a power tool, and a pulse width modulation controller for determining an amount of voltage supplied from the power supply to the motor. Power tools may include drills, saws, sanders, grinders, routers, and the like that employ electrical power to an electric motor.

This invention not only protects batteries, it also enables power tools to use batteries where the potential current exceeds the maximum allowable current of the batteries.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention. Together with the general description, these drawings serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The present invention relates to a method and apparatus for controlling current supplied to a motor of a power tool, especially, a hand held power tool such as a drill. The present method may rely on pulse width modulation to control a voltage supplied to the motor, which proportionately affects the current supplied to a motor; especially, to a permanent magnet direct current motor. In one embodiment, circuitry of the present invention may determine motor current and battery voltage at a determined sampling rate. The measured values may be supplied to a microprocessor or other circuitry that pulse width modulates a voltage supplied to the power tool driving motor. In another embodiment, analog circuitry switches power to the motor according to the amount of current being provided to the motor.

Figure 1:
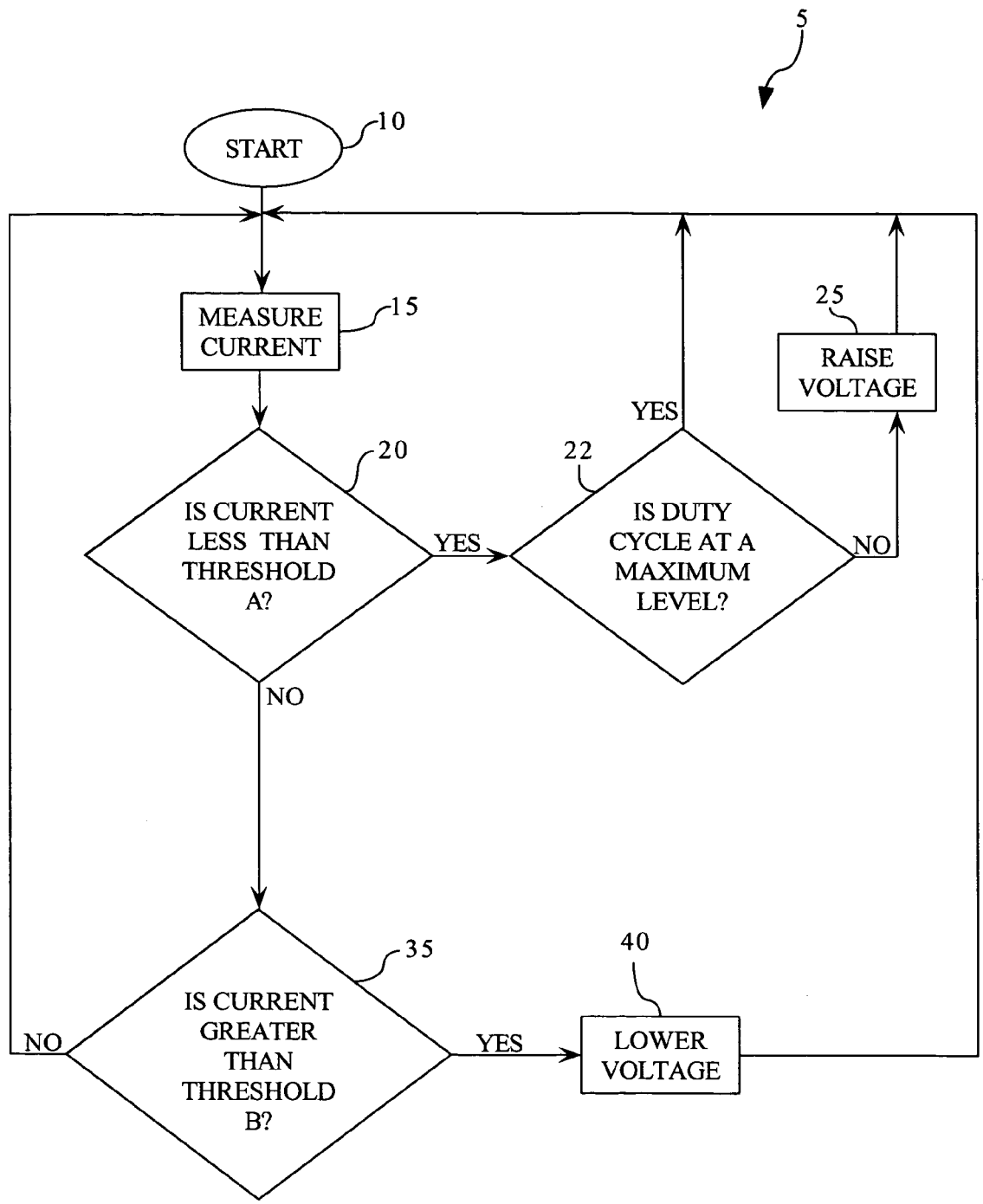
FIG. 1 illustrates an embodiment of a method of the present invention.

FIG. 1 illustrates an embodiment of a method 5 of the present invention. Method may start 10 by measuring current 15. If the current is below a threshold level A in step 20, the duty cycle may be checked to determine if it is at a 100% level (step 22). If the duty cycle is at a 100% level, the method may repeat. If the duty cycle is less than 100%, voltage may be raised (step 25). To prevent damaging a battery of a power tool, whenever the set amperage is exceeded (step 35, current is above threshold level B), the voltage is reduced (step 40). The voltage is reduced to the limit set by the controller. A pulse width modulation (PWM) controller reduces the average voltage so that the stall current of the motor will not exceed the limit of the batteries. Then, as the load is removed from the motor, the PWM controller raises the voltage until it reaches nominal peak voltage as long as the current stays below the limit. In an embodiment of the invention, the raising and reducing of the voltage refers to the voltage level of the overall averaged voltage.

Figure 2:
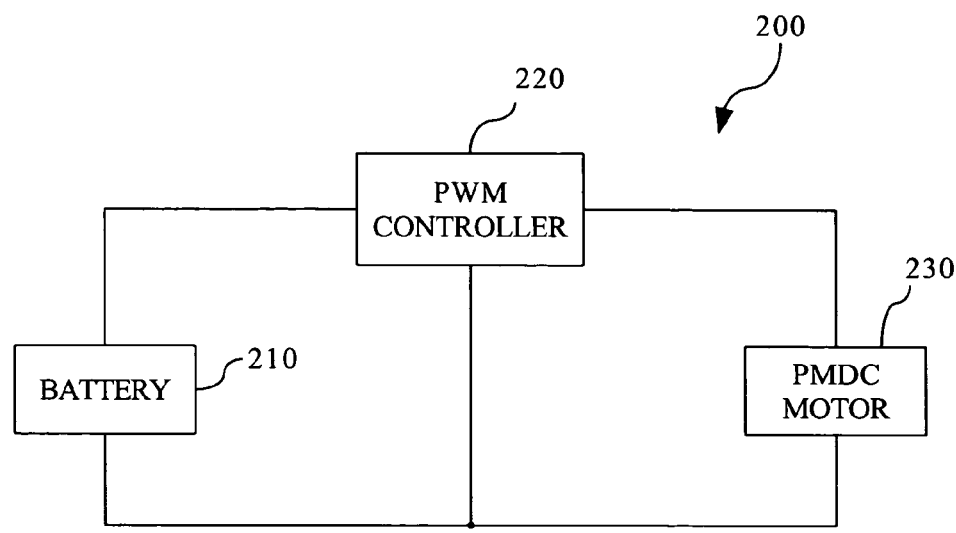
FIG. 2 illustrates a basic block diagram an embodiment of the method of the present invention.

A basic functional block diagram of an embodiment of an apparatus 200 of the present invention is shown in FIG. 2. This invention preferably uses a pulse width modulation controller 220 with a closed amperage (or current) feedback loop, a permanent magnet direct current (PMDC) motor 230, and a power supply 210. The power supply 210 of the present invention is preferably a battery or a series of batteries. Lithium ion may be a preferred type of battery. For lithium ion batteries, a maximum safe current may be approximately 15 amps, however, current limits may be affected by the battery temperature when driven by the amp load. Other batteries may be used, such as hydrogen ion batteries, nickel cadmium batteries, and the like. The batteries are preferably rechargeable.

Permanent Magnet Direct Current (PMDC) motors are durable motors whose permanent magnet field is able to operate for thousands of hours and function in long duty cycle applications. These motors also have a long shelf life and high-stall torque. PMDC motors produce maximum torque at zero rotations per minutes (RPMs), produce zero torque at the maximum RPMs, and produce 50% of maximum torque at 50% of the maximum RPM value. At 50% of the maximum RPM value, the PMDC motors produce maximum horsepower. PMDC motors, at any given voltage, consume amps proportional to the torque required. Actual stall currents of PMDC motors in power tool applications are limited by impedance of the battery pack to approximately 85 amps for NiCd, regardless of the designed stall current of the motor. Other combinations of motors, batteries, and controllers may be used in the present invention.

Figure 3:
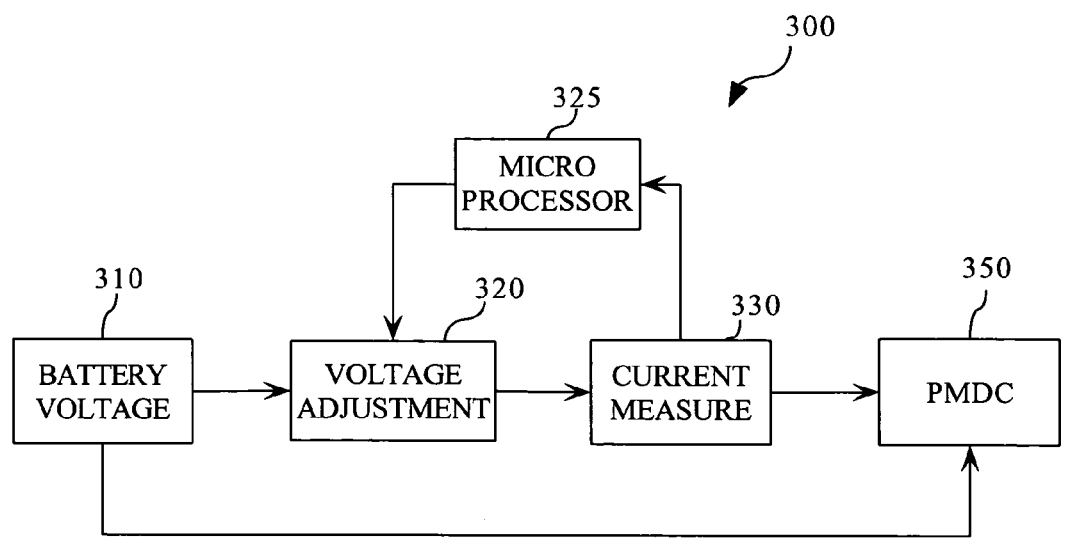
FIG. 3 illustrates a functional block diagram of an embodiment of the present invention.

An exemplary embodiment of a current feedback loop 300 is shown in FIG. 3. A battery voltage 310 is supplied by the battery. The current supplied by the power source is increased or decreased through a voltage adjustment 320. The measured current 330 is provided to the microprocessor 325 which determines if the current is to be increased or decreased, as controlled by the voltage adjustment 320. Current, within a desired range, may be supplied to the motor 350, such as a PMDC motor.

Figure 4:
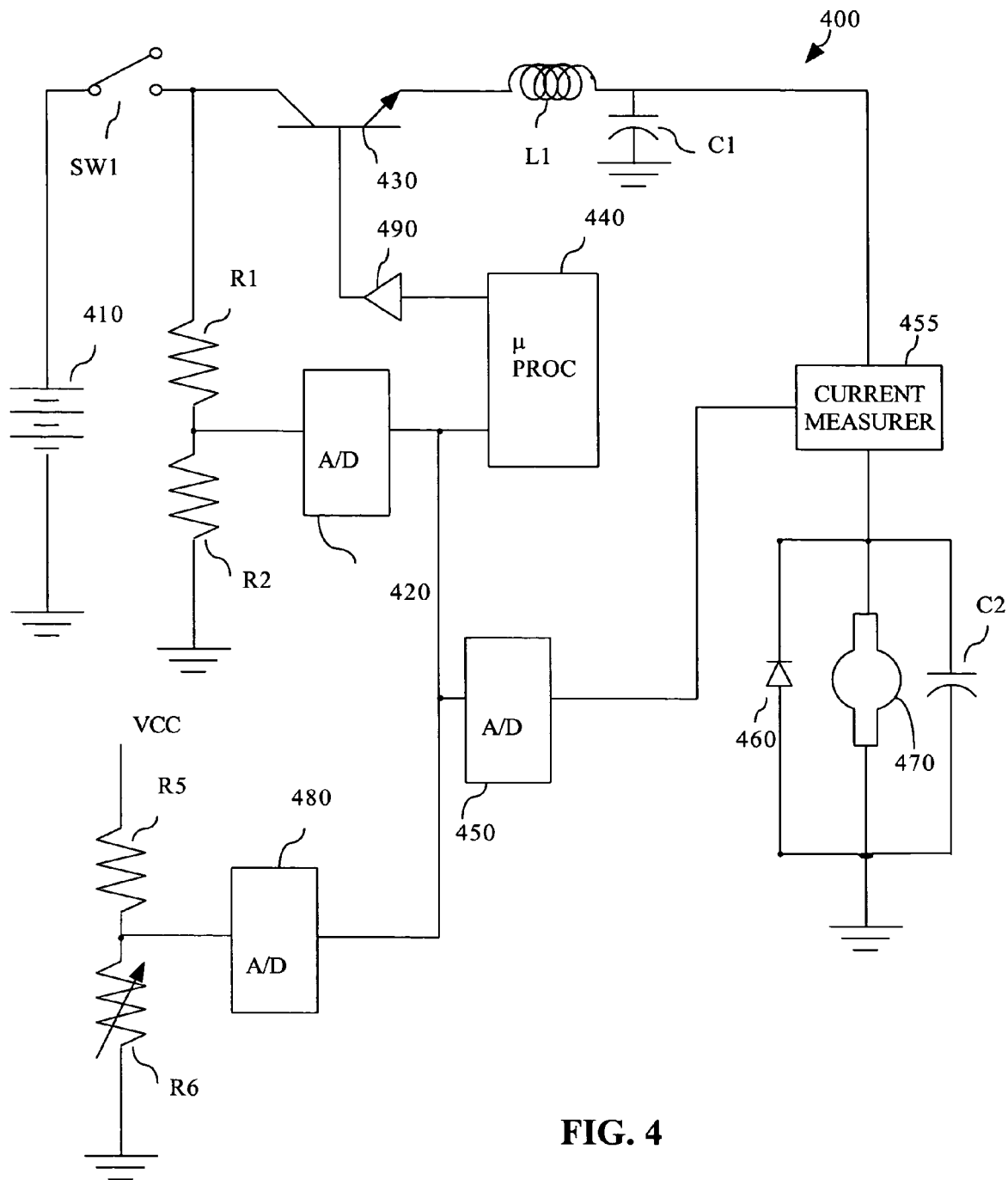
FIG. 4 illustrates an embodiment of an exemplary circuit of the present invention.

FIG. 4 illustrates a circuit 400 of an exemplary embodiment of the present invention. The power supply 410 may use lithium ion batteries for low current applications, hydrogen ion batteries for even lower current applications, NiH6 batteries when more stable current operations are needed, or batteries of another type. The power supply 410 is preferably two or more batteries, always in series, such that each battery serves as one component of a multi-component power supply. The batteries are arranged such that the positive terminal that is uncoupled to any other battery serves as the positive terminal of the power supply and the negative terminal that is uncoupled to any other battery serves as the negative terminal of the power supply. Preferably, the batteries are rechargeable. Other power supply arrangements are contemplated by the present invention.

A manually operated switch SW1 is preferably used to electrically connect the power supply 410 with the circuitry. Power supply voltage is continually monitored once the circuitry is activated by closing switch SW1. A voltage divider in parallel with the power supply 410 permits measurement of voltage over time for monitoring power levels of the power supply 410. The voltage measured by the analog to digital conversion block 420 is determined by a voltage divider formed of resistors R1 and R2. For a battery voltage of approximately 40 volts, R1 may be set to a value seven times greater than the value of R2 to provide an approximate maximum 5-volt value to the A/D conversion block 420. The resistors may be selected to minimize the current drawn through the voltage divider. For instance, R1 may be 100 k$\Omega$ and R2 may be 14.3 k$\Omega$. Preferably, the resistors used in the voltage dividers are temperature insensitive and precision resistors.

The pulse width modulation controller determines the current supplied to the motor 470. The amount of current supplied may be determined by a switch such as a power transistor 430. The power transistor base (for a bipolar junction transistor) or gate (for a metal oxide semiconductor field effect transistor) is supplied a signal by the microprocessor 440. This signal may be set at a high voltage level for turning on the power transistor 430 and may be set at a low voltage level for turning off the power transistor 430; in other words, in a binary manner. Alternatively, the converse arrangement of a low voltage level turning on the power transistor may be employed. To ensure adequate voltage is delivered to the power transistor 430, a booster circuit 490 may raise the voltage or provide adequate driving capability for switching the power transistor. The booster circuit may be an operational amplifier, a transistor, or the like. The microprocessor determines the signal to be supplied by monitoring battery voltage and motor current. The power transistor may include two or more power transistors in parallel and may also include a diode to enhance reliability. An advantage to using a power transistor is that the power transistor dissipates minimal power. The pulse width modulation power transistor 430 may turn on, for a percentage of time regulating average voltage to the motor and thereby limiting the average voltage to the motor when peak currents are exceeded. The duty cycle of the pulse width modulation is varied according to an algorithm provided in the executable code of the microprocessor. When the power transistor is on for longer periods, the voltage provided to the motor increases, thereby increasing motor speed. The rate of pulse generation may be varied so as to ensure accurate and adequate current flow to the motor. The power transistor, in an alternative embodiment, may be placed between the motor and ground.

As illustrated in FIG. 4, a filter may be provided at the output of the power transistor 430. Here, an inductor L1 dampens current spikes and a capacitor C1 smoothes out the voltage to the motor. Many different filters may be used to smooth out the pulsed voltage waveform. The transistor 430 is an option as the power transistor may be pulsed often enough that the inductance of the motor compensates for any abrupt voltage changes across the motor.

A current measurer 455 may be used to determine current through the motor 470. Flyback diode 460 and/or capacitors may be disposed across the terminals of the motor to smooth out current changes, to suppress voltage spikes, and to provide a current path when power is cut off. The capacitors may be of a suitable type and value, such as 0.1 $\mu$Fd ceramic capacitors. Diode 460 may be a single diode or multiple diodes.

Motor speed control may be manually set by a rotary knob externally accessible to an operator on the outside of the power tool housing. For example, the rotary knob may be coupled to a potentiometer R6 that controls a value of a resistor in a voltage divider with another resistor R5. The voltage across the potentiometer resistor R6 is digitized by analog-to-digital (A/D) conversion block 480. The digitized voltage value is then read by the microprocessor 440 to determine the motor speed setting.

The microprocessor 440 provides analysis and control in the pulse width modulation speed controller. The microprocessor may have an associated read only memory (ROM) and an associated random access memory (RAM). In the embodiment of FIG. 4, a microprocessor 440 controls the pulse width modulation of the motor 470. The microprocessor 440 is loaded with executable code from read only memory. The executable code provides for measuring the battery voltage, the motor voltage, and a speed control potentiometer voltage. The executable code may be written so as to permit different kinds of batteries in power supply 410. A switch on the body of the power tool may be implemented so as to allow a user to choose a particular type of battery. The microprocessor would read the switch value to determine the portion of the executable code to run for a particular battery type. The power supply housing may also contain actuators that are able to detect the battery type placed within. An example of the processing performed by the microprocessor 440 is provided by the following pseudo code:

Measure battery voltage;
   Address battery voltage storage;
   Read battery voltage value;
   Store battery voltage;
End battery voltage;
Measure motor current;
   Address motor voltage storage;
   Read motor voltage;
   Calculate motor current;
   Store motor current;
End motor current;
Measure speed control potentiometer voltage;
   Address speed control potentiometer voltage storage;
   Read speed control potentiometer voltage;
   Store speed control potentiometer voltage;
End speed control potentiometer voltage;
Adjust pulse width;
   Case (motor current>maximum tolerable current) then pulse width=0 and shut off power to the motor;
   Case (motor current>upper current level 1 and motor current≦maximum tolerable current) then pulse width=a;
   Case (motor current>upper current level 2 and motor current≦upper current level 1) then pulse width=b;
   And so forth;
   Case (motor current>upper current level n and motor current≦upper current level n−1) then pulse width=n;
End Adjust Pulse Width;
Main
Begin_loop;
   Measure battery voltage;
   Measure motor current;
   Measure speed control potentiometer voltage;
   Scale factor=speed control potentiometer voltage/C;
   Case (motor current<threshold a) then adjust pulse width;
   Case (motor current>threshold b) then adjust pulse width;
   Case (battery voltage<threshold c/Scale factor) then issue alert and shut off power to the motor;
   Case (battery voltage>threshold d/Scale factor) then issue alert and shut off power to the motor;
End_loop;
End Main;

It is contemplated that stages produced for varying increasing motor current values may also be applied to decreasing current values.

The power supply for the microprocessor, A/D converters, and booster circuit may be provided by the power supply 410 or another power source, such as a separate battery. A monitoring circuit may independently measure the strength of power supply 410 or may receive a signal from the microprocessor 440 to determine this value. If the monitoring circuit determines that the power supply 410 has been excessively discharged, the microprocessor and related circuitry may be switched to a back up battery to continue operations. Also, an indicator light, such as a light emitting diode, may be lit on the power tool housing. Alternatively, a display on the housing may provide accurate readings of the power supply conditions of the power tool circuitry.

Figure 5:
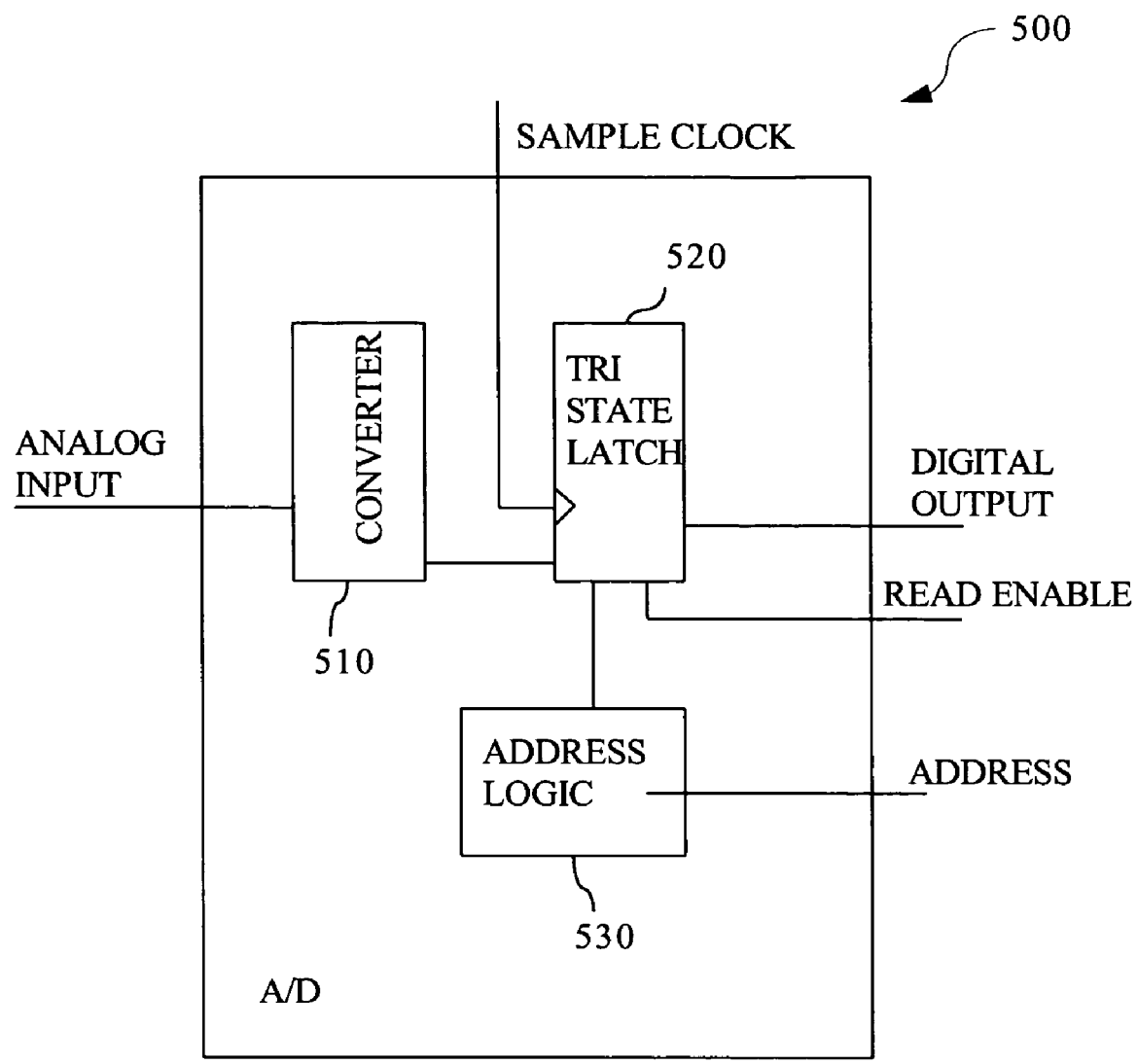
FIG. 5 illustrates an embodiment of an analog-to-digital conversion block of FIG. 4.

FIG. 5 illustrates an exemplary embodiment of an A/D conversion block 500. A/D conversion block may be representative of A/D converter block 420, 450, 480 of FIG. 4. The A/D converter 510 receives the analog voltage input directly from a voltage measuring point, such as from a voltage divider, through an operational amplifier, or the like. The A/D converter 510 provides a digitized value to a tristatable latch 520. For each sample clock pulse, a digitized value from the A/D converter 510 is stored in the latch 520. The sample clock may be provided by the microprocessor, from an oscillator circuit, or by other circuitry. When the microprocessor 440 executes the code that requires the current digitized value, the microprocessor provides the address for the latch storing this value. In other embodiments, the number of address bits may vary, such as having three address bits to address from five to eight addressable latches. In the present embodiment, a two-bit address bus would be sufficient to uniquely address the three A/D conversion blocks. The AID conversion block's addressing logic enables the tristatable latch 520. A read enable signal may also be provided to read data from the tristatable latch 520. The read enable signal is optional. In one embodiment, the address logic serves to disable the sample clock and the read enable in conjunction with the address logic serves to permit the latched digitized value to be read from the bus.

Figure 6:
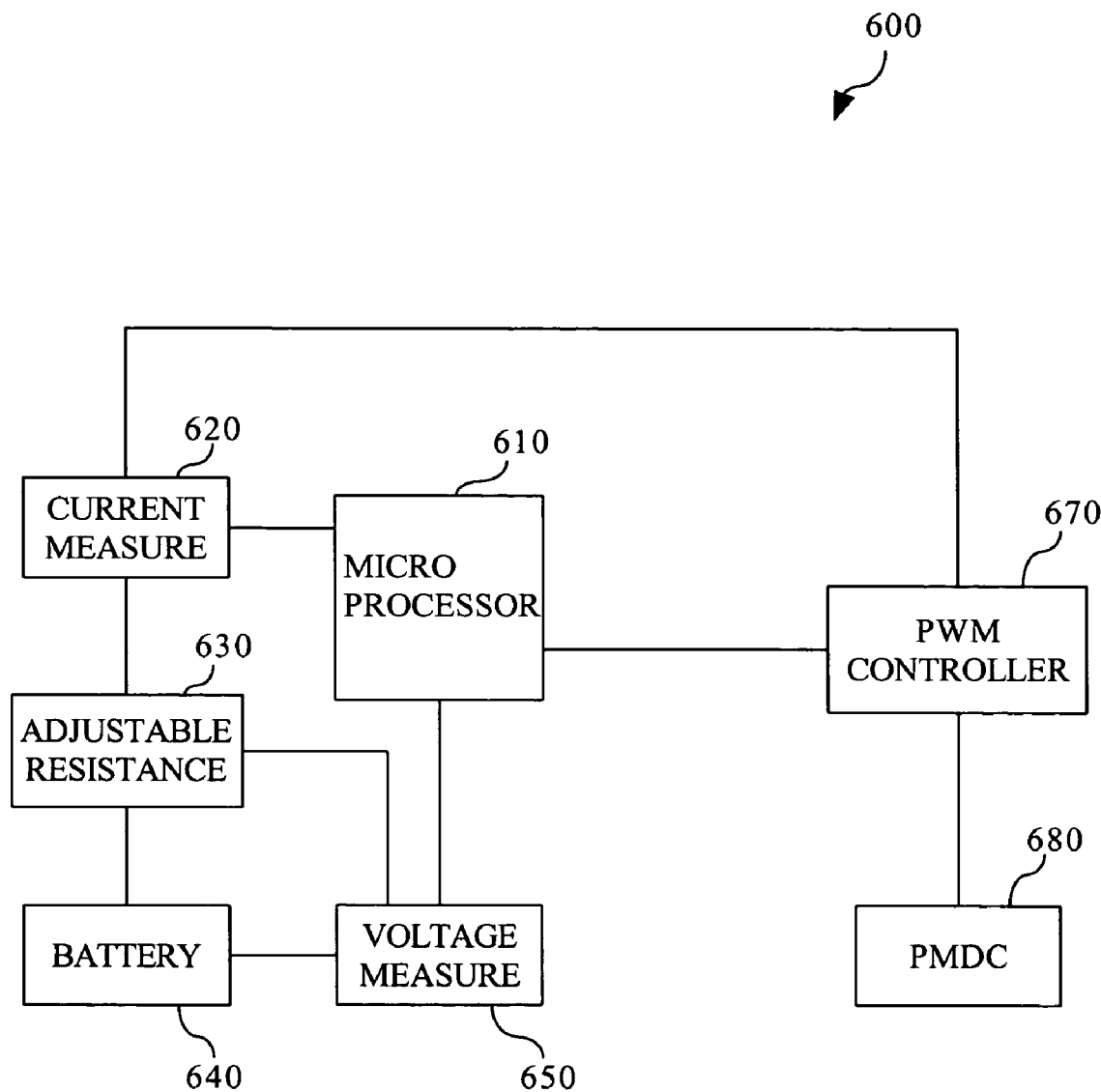
FIG. 6 illustrates a functional block diagram of another embodiment of the present invention.

FIG. 6 illustrates a functional block diagram of another embodiment of a circuit 600 of the present invention. An adjustable resistance 630 is placed in series with the power supply 640 to better control the current and voltage from the power supply. The voltage of the adjustable resistance 630 and the power supply 640 may be measured by a voltage measurement circuit 650. A current measurement circuit 620 may also provide a current measurement to a microprocessor 610. The microprocessor 610 may signal the pulse width modulation controller 670 to pulse on or pulse off. The pulse width modulation controller, as in the other embodiments, may control the current and voltage supplied to the motor 680. The adjustable resistance 630 may be used to offset a change in the internal resistance of the power supply 640.

Figure 7:
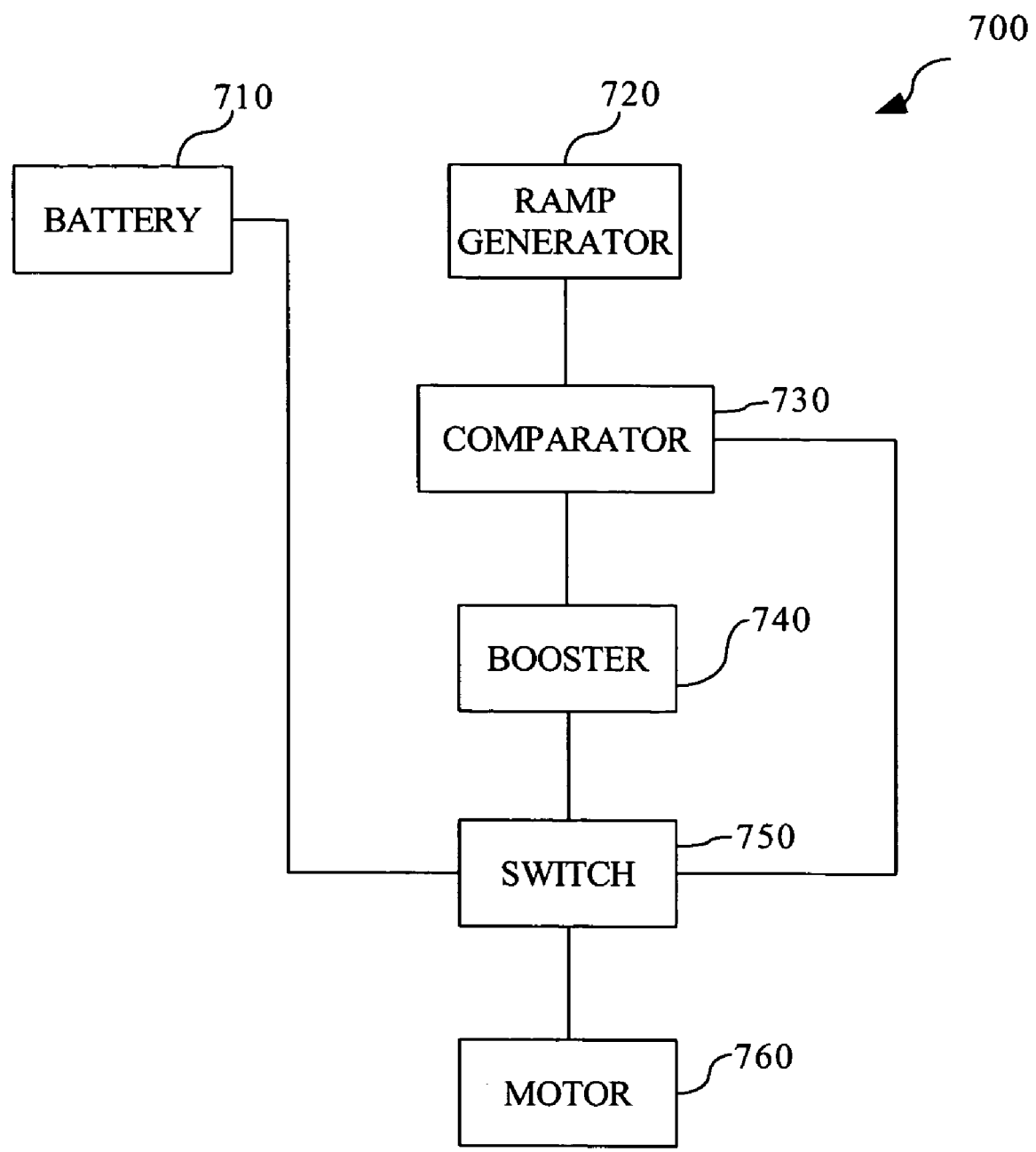
FIG. 7 illustrates a functional block diagram of yet another embodiment of the present invention.

FIG. 7 illustrates a functional block diagram for another embodiment of the circuit 700 of the present invention. This embodiment is especially useful for an analog implementation of the present invention. A ramp generator 720 is used to supply a ramp voltage, such as a saw tooth, triangular, staircase, or similar waveform. A voltage corresponding to a current across the motor 760 is compared with the ramp voltage by a comparator 730. A variety of processing algorithms may be employed through circuitry to supply the motor voltage value to the comparator. For instance, for a lithium ion battery power supply that operates in accordance with FIG. 10, the switch may be initially opened without interruption and, only when a certain motor current value corresponding to the measured motor voltage is reached, the switch may pulse the power from the power supply to the motor. The pulse width during pulsing may further be determined by the amount the determined motor current value is above a certain current level. For example, the power supplied to the motor may be continuous up through a determined motor current of 14.2 amps, then it may be supplied to the motor through pulses with adjustable duty cycle, and, if a certain motor current level is exceeded (e.g., 15 amps), the power supply may be shut off. A booster circuit 740 may be used to provide ample current and voltage to actuate the switch 750.

Figure 8:
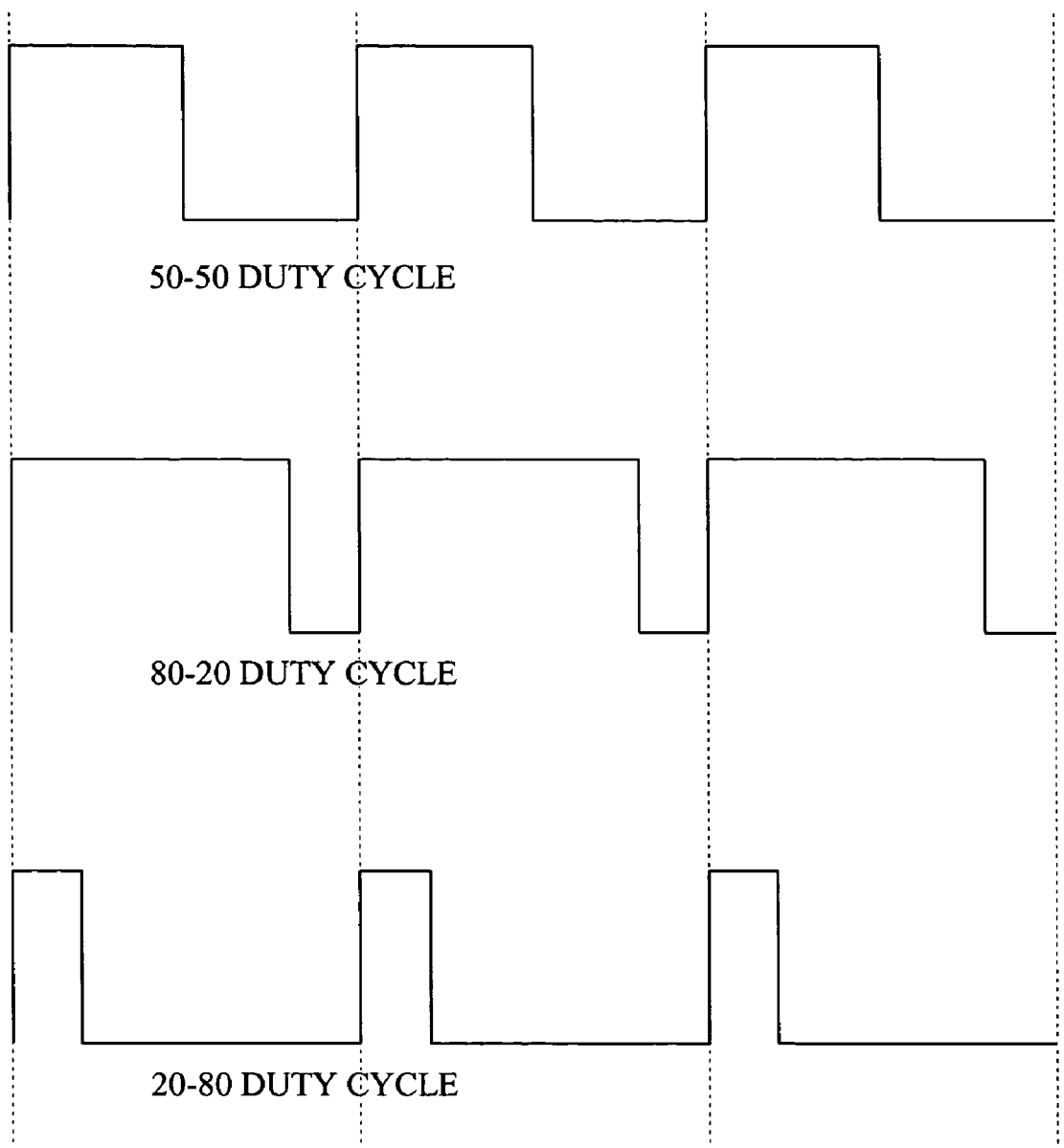
FIG. 8 illustrates illustrative pulse width modulation waveforms of the present invention.

FIG. 8 illustrates exemplary pulse width modulation waveforms. An initial duty cycle may be set, such as a 50% duty cycle when implemented in software. A hardware implementation will quickly establish the necessary duty cycle. When more voltage is to be supplied to the motor, the duty cycle may be adjusted to provide voltage for a larger percentage of the cycle. Conversely, when less voltage is to be supplied to the motor, the duty cycle may be adjusted to apply voltage for a lesser percentage of the cycle.

Figure 9:
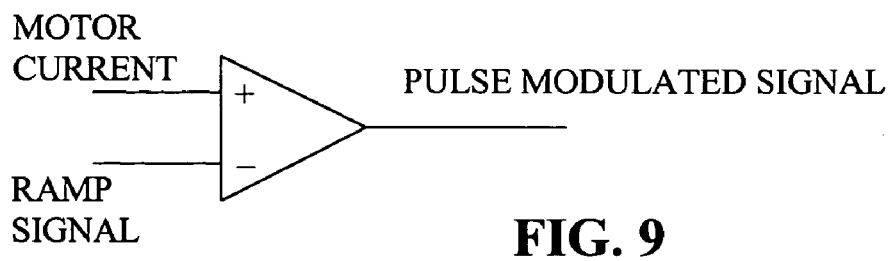
FIG. 9 illustrates an exemplary embodiment of pulse width modulation generation circuitry.

FIG. 9 illustrates an exemplary embodiment of pulse width modulation circuitry. A ramp signal is applied to the inverting terminal of an operational amplifier. A voltage signal is applied to the non-inverting terminal of the operational amplifier. The voltage signal may be provided directly from a voltage divider, may be further amplified or scaled, or may be otherwise provided by circuitry. The ramp signal may be a saw tooth or triangular waveform. An integrator may also be used to generate the ramp signal.

Figure 10:
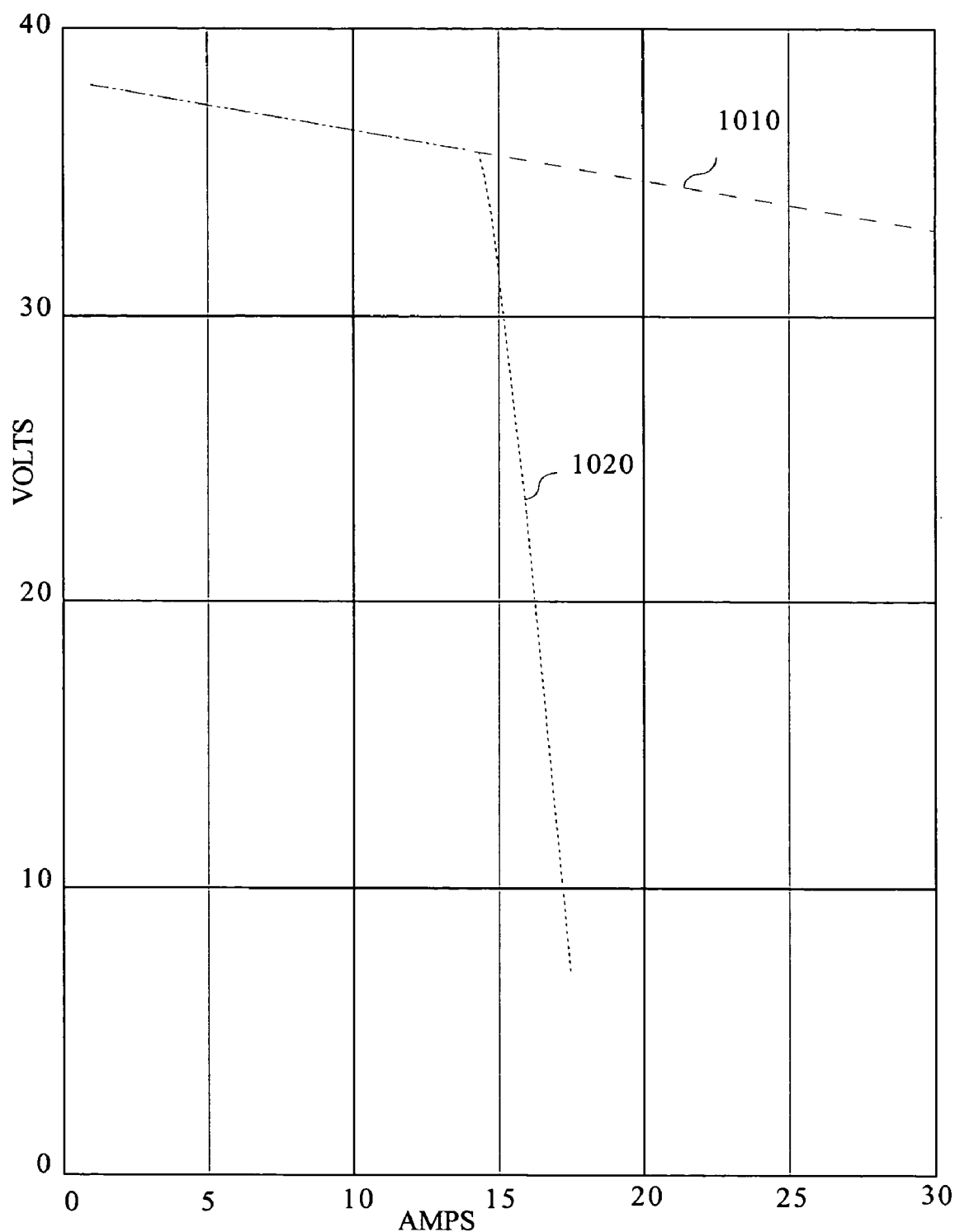
FIG. 10 illustrates a graph of voltage versus current for a lithium ion battery power source of the present invention.

FIG. 10 illustrates the relationship of input 1010 to output voltage of a controller for a lithium battery power supply of the present invention. As shown in the graph, the input power supply voltage 1010 correlates in a one to one relationship with the controller output voltage 1020 until about 14 amps in which both input and output controller voltages decline in a gradual linear manner. At slightly above 14 amps and above, the output controller voltage decreases rapidly.

Figure 11:
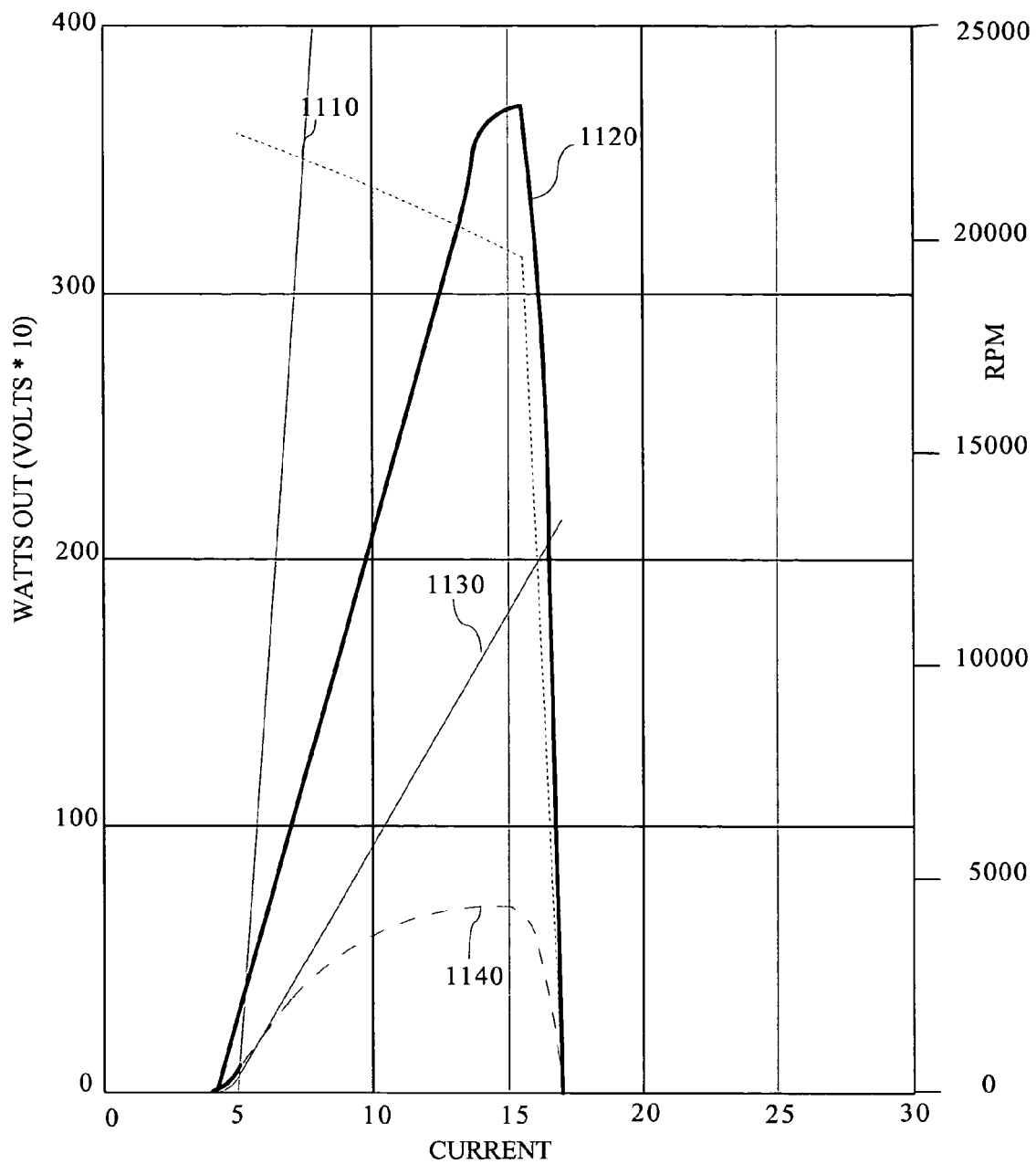
FIG. 11 illustrates a graph of power, torque, efficiency, and rpms for the present invention.

FIG. 11 illustrates the relationship of motor efficiency 1140, torque 1130, power consumed 1110, and rotations per minute of the motor 1120.

While the present application has disclosed a method and system for reducing power, it is contemplated that other types of mechanisms may be employed to reduce voltage and/or current to reduce power which would not depart from the scope and intent of the present invention. The embodiments disclosed herein for reducing power being only exemplary of the present invention.

Other variations are contemplated by the present invention. Optical encoders, clamped on ammeters, tachometers, protection circuits, emergency power cut off, current sensing transducers, voltage sensing transducers, current shunts, error amplifiers, clipping circuits, and the like may be used. The pulse width modulation switch is not limited to being a transistor, but may be another component, such as a mechanical relay switch.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages, the form hereinbefore described being merely an explanatory embodiment thereof. It is the intention of the following claims to encompass and include such changes.

What is claimed is:

1. A method for extending the life of a power supply that supplies power to a motor in a power tool, comprising:
   supplying voltage pulses of an initial width to the motor using pulse width modulation;
   comparing a motor current generated due to the supplied voltage pulses to at least one of three different thresholds; and
   changing the pulse width from the initial width to one of zero, a first alternative pulse width and a second alternative pulse width based on the comparison to a given threshold.

2. The method of claim 1, wherein the alternative width is shortened.

3. The method of claim 1, wherein the alternative width is lengthened.

4. A power tool, comprising:
   a housing;
   a power supply disposed within the housing and including a plurality of lithium ion batteries;
   a motor disposed within the housing and providing torque to the power tool; and
   a pulse width modulation controller within the housing for varying the pulse width of voltage pulses supplied to the motor based on a comparison of the motor current to one of at least three different thresholds.

5. The power tool of claim 4, wherein the lithium ion batteries are rechargeable.

6. The power tool of claim 4, wherein the pulse modulation controller includes a switch that supplies current to the motor when the switch is turned on.

7. The power tool of claim 6, wherein the pulse modulation controller further includes a microprocessor that turns the switch on and off.

8. The power tool of claim 7, wherein the pulse modulation controller further includes voltage measuring circuitry to determine a turn on time for the switch.

9. The power tool of claim 8, wherein the voltage measuring circuitry measures battery voltage and motor voltage.

10. The power tool of claim 9, wherein power tool further includes circuitry for speed control.

11. The power tool of claim 10, wherein the circuitry for speed control includes a potentiometer.

12. The power tool of claim 11, wherein the voltage measuring circuitry further measures a voltage across the potentiometer.

13. The power tool of claim 6, wherein the pulse width modulation circuit further includes a ramp generator that provides a ramp signal.

14. The power tool of claim 13, wherein the pulse width modulation circuit further includes a comparator that compares the ramp signal to a measured motor voltage to determine the pulse width modulation waveform.

15. An apparatus for limiting current to a load, comprising:
   means for supplying power;
   means for providing torque to a load;
   means for switchably supplying power to the means for providing torque from the means for supplying power, the means for switchably supplying power being actuated according to a pulse width modulation technique; and
   means for controlling the means for switchably supplying power based on a comparison of current generated in the apparatus to one of at least three different thresholds.

16. The apparatus of claim 15, wherein the means for supplying power includes lithium ion batteries.

17. The apparatus of claim 16, wherein the means for supplying power provides a direct voltage between 30 and 40 volts.

* * * * *